United States Patent
Mori

(10) Patent No.: US 9,532,034 B2
(45) Date of Patent: Dec. 27, 2016

(54) THREE-DIMENSIONAL IMAGING APPARATUS AND THREE-DIMENSIONAL IMAGE DISPLAY METHOD

(75) Inventor: Koji Mori, Miyagi (JP)

(73) Assignee: FUJIFILM CORPORATION, Tokyo (JP)

( * ) Notice: Subject to any disclaimer, the term of this patent is extended or adjusted under 35 U.S.C. 154(b) by 1691 days.

(21) Appl. No.: 12/835,593

(22) Filed: Jul. 13, 2010

(65) Prior Publication Data
US 2011/0012996 A1    Jan. 20, 2011

(30) Foreign Application Priority Data
Jul. 17, 2009    (JP) .................... 2009-169316

(51) Int. Cl.
*H04N 13/02* (2006.01)
*H04N 13/04* (2006.01)

(52) U.S. Cl.
CPC ...... *H04N 13/0296* (2013.01); *H04N 13/0239* (2013.01)

(58) Field of Classification Search
CPC H04N 13/0239; H04N 13/0296; H04N 13/02; H04N 13/04
USPC .................................................. 348/47, 135
IPC ............................................. H04N 13/02, 7/18
See application file for complete search history.

(56) References Cited

U.S. PATENT DOCUMENTS

| 7,493,571 | B2 | 2/2009 | Shinohara et al. | |
| 2007/0285528 | A1* | 12/2007 | Mise et al. | 348/222.1 |
| 2007/0291155 | A1* | 12/2007 | Kawaguchi et al. | 348/333.12 |
| 2008/0072172 | A1 | 3/2008 | Shinohara et al. | |
| 2008/0158346 | A1* | 7/2008 | Okamoto et al. | 348/47 |
| 2009/0237494 | A1* | 9/2009 | Oota et al. | 348/51 |
| 2009/0298537 | A1* | 12/2009 | Choi | 455/556.1 |

FOREIGN PATENT DOCUMENTS

| JP | 2001-242529 A | 9/2001 |
| JP | 2004274125 A * | 9/2004 |
| JP | 2005-301992 | 10/2005 |
| JP | 2006-157605 A | 6/2006 |
| JP | 2008-058553 A | 3/2008 |
| JP | 2008-167066 A | 7/2008 |
| JP | 2009-81493 A | 4/2009 |

OTHER PUBLICATIONS

Notice of Reasons for Rejection dated Sep. 14, 2011, with English translation.
Japanese Office Action dated Feb. 22, 2013 with a partial English translation.

* cited by examiner

*Primary Examiner* — Francis G Geroleo
(74) *Attorney, Agent, or Firm* — McGinn IP Law Group, PLLC.

(57) ABSTRACT

A three-dimensional imaging apparatus includes: a plurality of shooting devices configured to shoot an object; a shutter switch; a display device configured to display a three-dimensional image generated by a plurality of images obtained by shooting an identical object from a plurality of view points by the plurality of shooting devices; and an OSD (on-screen display) control device configured to control display of OSD information superimposed and displayed on an image displayed on the display device, the OSD control device erasing and/or moving the display of the OSD information displayed on the three-dimensional image when the shutter switch is operated.

14 Claims, 11 Drawing Sheets

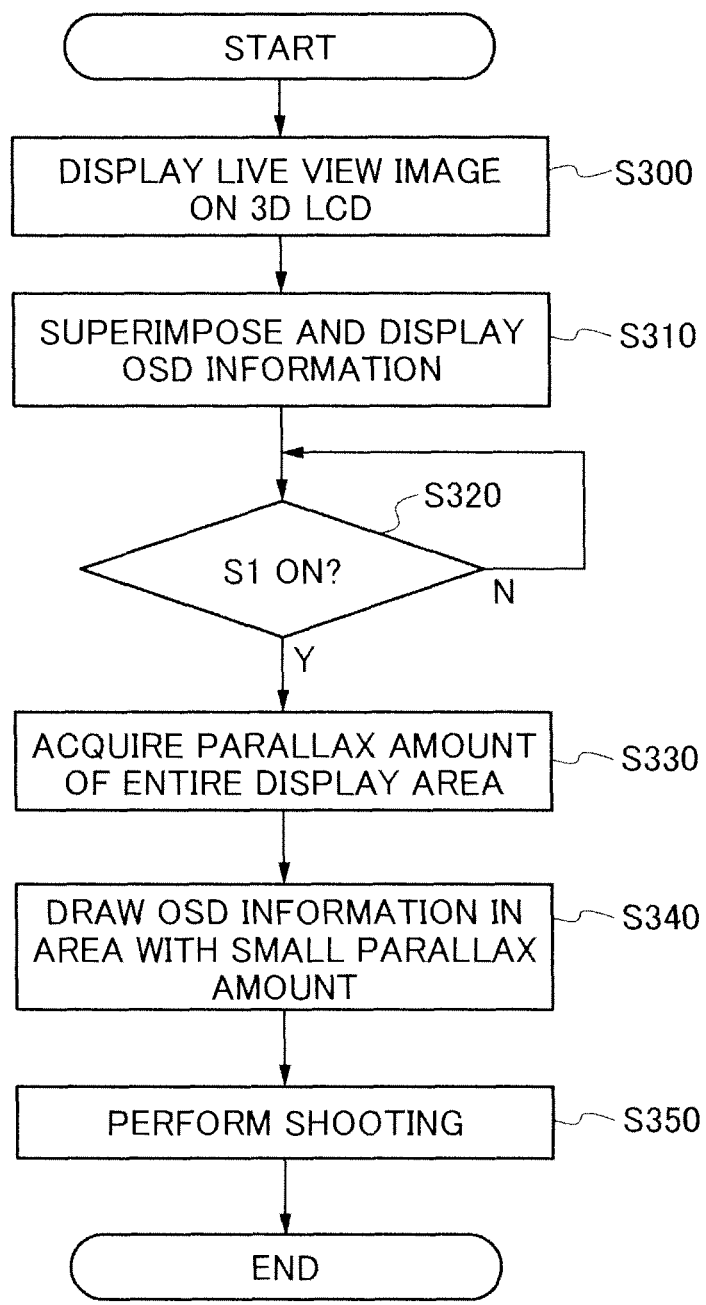

THREE-DIMENSIONAL IMAGING APPARATUS AND THREE-DIMENSIONAL IMAGE DISPLAY METHOD

BACKGROUND OF THE INVENTION

Field of the Invention

The presently disclosed subject matter relates to a three-dimensional (3D) imaging apparatus and a 3D image display method, and particularly, to a 3D imaging apparatus and a 3D image display method having an OSD (on-screen display) function to display an icon representing an apparatus status, an operation condition, and the like.

Description of the Related Art

Conventionally, there is a digital camera such as a digital still camera and a digital video camera having an OSD function to obtain an image to be displayed by superimposing a character image or the like representing various menus and marks which indicate an apparatus status and an operation condition on an imaged object image which is used as a background image, and to display the obtained image on a display device such as an LCD (liquid crystal display).

For example, when, by an OSD function of a digital camera, an icon representing set contents such as an imaging condition (exposure condition) is displayed on a display, a small display can cause a failure to notice an incorrectly set condition because of the hard-to-see icon. In order to prevent this failure, the icon can be enlarged to be seen clearly (see Japanese Patent Application Laid-Open No. 2005-301992).

In recent years, there has been developed a digital camera having a plurality of optical systems capable of shooting an image for stereoscopic viewing. Such a digital camera is configured to be able to stereoscopically view a plurality of shot images on a display.

SUMMARY OF THE INVENTION

Unfortunately, when providing a digital camera for shooting a stereoscopic image with an OSD function to display an icon or the like representing various information regarding imaging (shooting) or an image reproduction (OSD information) on a display, two-dimensionally displayed (2D-displayed) OSD information superimposed and displayed on the stereo view image can interfere with stereoscopic viewing of the viewer, and thus it is difficult to stereoscopically view the stereo view image displayed on the display.

The presently disclosed subject matter has been made in view of the above circumstances, and an object of the presently disclosed subject matter is to provide a 3D imaging apparatus and a 3D image display method capable of displaying an object image as a 3D image on a display device of a 3D imaging apparatus and improving visibility of stereoscopic viewing.

In order to achieve the above object, the first aspect of the presently disclosed subject matter provides a 3D imaging apparatus including: a plurality of shooting devices configured to shoot an object; a shutter switch; a display device configured to display a three-dimensional image generated by a plurality of images obtained by shooting an identical object from a plurality of view points by the plurality of shooting devices; and an OSD (on-screen display) control device configured to control display of OSD information superimposed and displayed on an image displayed on the display device, the OSD control device erasing and/or moving the display of the OSD information displayed on the three-dimensional image when the shutter switch is operated.

Thus, visibility of stereoscopic viewing an object image displayed on the display device of the 3D imaging apparatus can be improved by quickly erasing the OSD information superimposed and displayed on the 3D image without interference with the stereoscopic viewing.

The second aspect of the presently disclosed subject matter provides the 3D imaging apparatus according to the first aspect further including a focus control device configured to control a position of the focus lens included in each of the shooting devices, wherein the OSD control device erases the display of the OSD information on the display device when the shutter switch is operated to fix the position of the focus lens.

Thereby, the OSD information is configured to be erased at AF focusing, and thus visibility of a focused stereo image can be improved.

The third aspect of the presently disclosed subject matter provides the 3D imaging apparatus according to the first or second aspect, wherein the OSD control device erases all the OSD information displayed on the display device.

Thus, visibility of stereoscopic viewing can be improved by erasing all the OSD information interfering with stereoscopic viewing.

The fourth aspect of the presently disclosed subject matter provides the 3D imaging apparatus according to the first or second aspect, wherein the OSD control device erases only a part of the OSD information displayed on the display device.

The fifth aspect of the presently disclosed subject matter provides the 3D imaging apparatus according to the fourth aspect, wherein the OSD control device erases the OSD information displayed in an area in which a principal object is displayed on the display device.

Thus, visibility of stereoscopic viewing can be effectively improved by erasing only the OSD information particularly in an area interfering with stereoscopic viewing of the 3D image.

The sixth aspect of the presently disclosed subject matter provides a 3D imaging apparatus according to the first aspect, further including: a face detection device configured to detect a face of a person in the plurality of images; and a face frame display device configured to display a face frame on the detected face in a three-dimensional image generated by the plurality of images in which a face of a person is detected, wherein the OSD control device erases the face frame displayed on the display device when the shutter switch is operated.

Thus, visibility of stereoscopic viewing an object person displayed on the display device of the 3D imaging apparatus particularly for person shooting can be improved by quickly erasing the face frame superimposed and displayed on the face of the person displayed as a 3D image without interference with the stereoscopic viewing.

The seventh aspect of the presently disclosed subject matter provides the 3D imaging apparatus according to the sixth aspect further including a focus control device configured to control a position of the focus lens included in each of the shooting devices, wherein the OSD control device erases the display of the OSD information on the display device when the shutter switch is operated to fix the position of the focus lens.

Thereby, the face frame is configured to be erased at AF focusing, and thus visibility of an object person as a focused stereo image can be improved.

The eighth aspect of the presently disclosed subject matter provides the 3D imaging apparatus according to any one of the first to seventh aspect, further including a calculation device configured to calculate a parallax amount of each of a plurality of areas which are obtained by dividing a display screen of the display device, wherein the OSD control device moves the display of the OSD information displayed on the display device to an area, the parallax amount of which is smaller than a threshold value, when the shutter switch is operated.

The display position of the OSD information is moved to an area with a small amount of parallax on the display screen of the display device, thus the OSD information may not interfere with stereoscopic viewing.

The ninth aspect of the presently disclosed subject matter provides a 3D image display method including: displaying a three-dimensional image on a display device configured to display a three-dimensional image generated by a plurality of images obtained by shooting an identical object from a plurality of viewing points by a plurality of shooting devices; superimposing and displaying a display of OSD (on-screen display) information on the three-dimensional image displayed on the display device; and erasing and/or moving the display of the OSD information displayed on the three-dimensional image when a shutter switch is operated.

Thus, visibility of stereoscopic viewing an object image displayed on the display device of the 3D imaging apparatus can be improved by quickly erasing the OSD information superimposed and displayed on the 3D image without interference with the stereoscopic viewing.

The tenth aspect of the presently disclosed subject matter provides a 3D image display method according to the ninth aspect, further including: detecting a face of a person in the plurality of images; displaying a face frame on the detected face in a three-dimensional image generated by the plurality of images in which a face of a person is detected; and erasing the face frame displayed on the display device when the shutter switch is operated.

Thus, visibility of stereoscopic viewing an object person displayed on the display device of the 3D imaging apparatus particularly for person shooting can be improved by quickly erasing the face frame superimposed and displayed on the face of the person displayed as a 3D image without interference with the stereoscopic viewing.

The eleventh aspect of the presently disclosed subject matter provides the 3D image display method according to the ninth aspect, further including: calculating a parallax amount of each of a plurality of areas which are obtained by dividing a display screen of the display device; and moving the display of the OSD information displayed on the display device to an area, the parallax amount of which is smaller than a threshold value, when the shutter switch is operated.

As described hereinbefore, the presently disclosed subject matter can improve visibility of stereoscopic viewing an object image displayed on the display device of the 3D imaging apparatus by quickly erasing the OSD information superimposed and displayed on the 3D image without interference with the stereoscopic viewing.

BRIEF DESCRIPTION OF THE DRAWINGS

FIG. 1A is a front view thereof, and FIG. 1B is a rear view thereof;

FIG. 8 is a flowchart illustrating the third example of the OSD control;

DETAILED DESCRIPTION OF THE PREFERRED EMBODIMENTS

Hereinafter, by referring to the accompanying drawings, a three-dimensional (3D) imaging apparatus and a 3D image display method according to the presently disclosed subject matter will be described in detail.

Figure 1A:
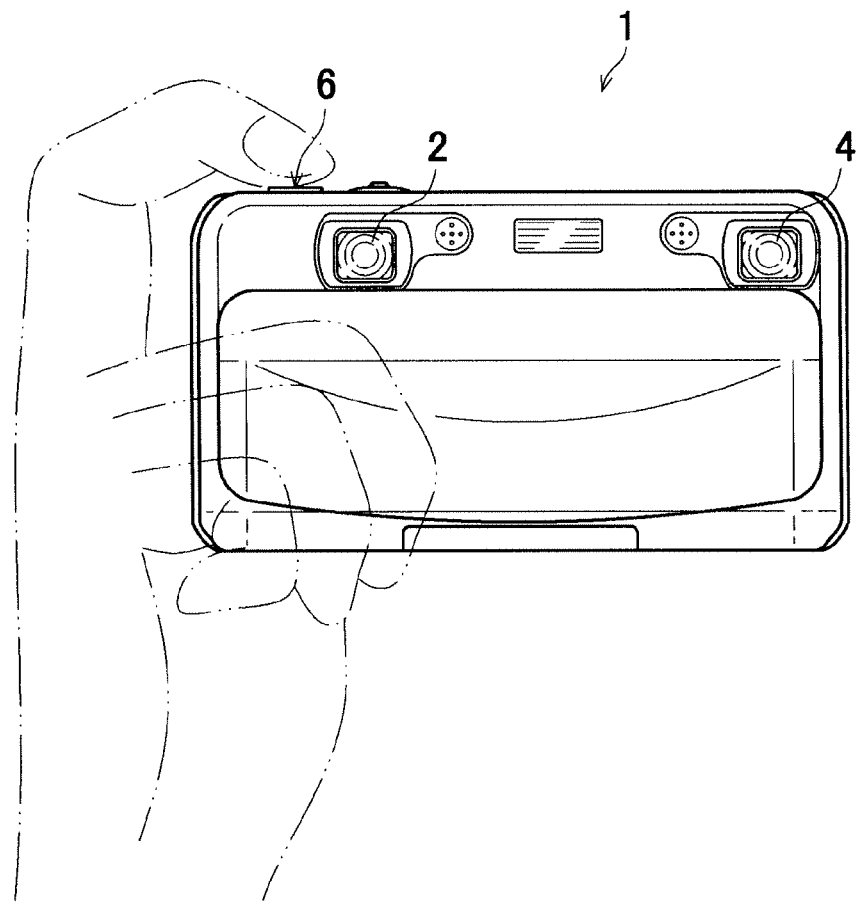
FIGS. 1A and 1B are external views of a digital stereoscopic camera as an embodiment of a three-dimensional (3D) imaging apparatus of the presently disclosed subject matter.
Figure 1B:
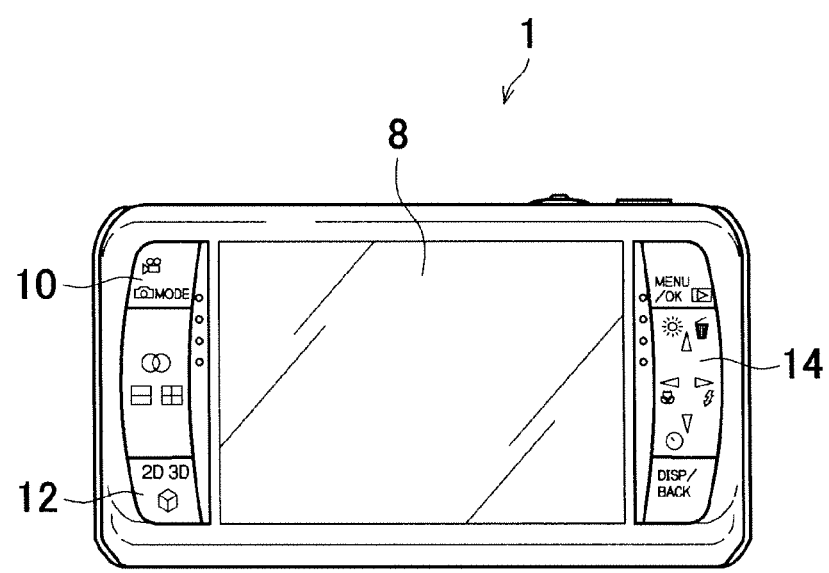

FIGS. 1A and 1B each are an external view of a digital stereoscopic camera as an embodiment of a 3D imaging apparatus of the presently disclosed subject matter. FIG. 1A is a front view thereof, and FIG. 1B is a rear view thereof.

This digital stereoscopic camera 1 has two imaging units each including a CCD (charge-coupled device) image sensor and a shooting lens. As illustrated in FIG. 1A, a first lens 2 and a second lens 4 are arranged side by side and spaced at a constant distance in a horizontal direction on a front surface of the digital stereoscopic camera 1. In addition, a shutter button (release button) 6 used for shutter release operation is provided on an upper surface of the digital stereoscopic camera 1.

As illustrated in FIG. 1B, an LCD panel (display device) 8, various operation buttons such as a shooting mode selector button 10, a 2D/3D selector button 12 and a cross-shaped button 14 are provided on a rear surface of the digital stereoscopic camera 1.

At the time of shooting a three-dimensional (3D) image, a stereo image is generated based on object images imaged through the first lens 2 and the second lens 4 and is displayed on the LCD panel 8 in real-time. At the time of reproduction of a three-dimensional image, a stereo image is generated based on a recorded image and is displayed on the LCD panel 8. Note that when shooting a two-dimensional (2D) image, an object image may be imaged through any one of the first lens 2 and the second lens 4. Then, the object image is displayed on the LCD panel 8 as the 2D image.

The shooting mode selector button 10 switches between a moving image mode and a still image mode. The 2D/3D selector button 12 switches the display of the LCD panel 8 between a 2D image and a stereo image.

Figure 2:
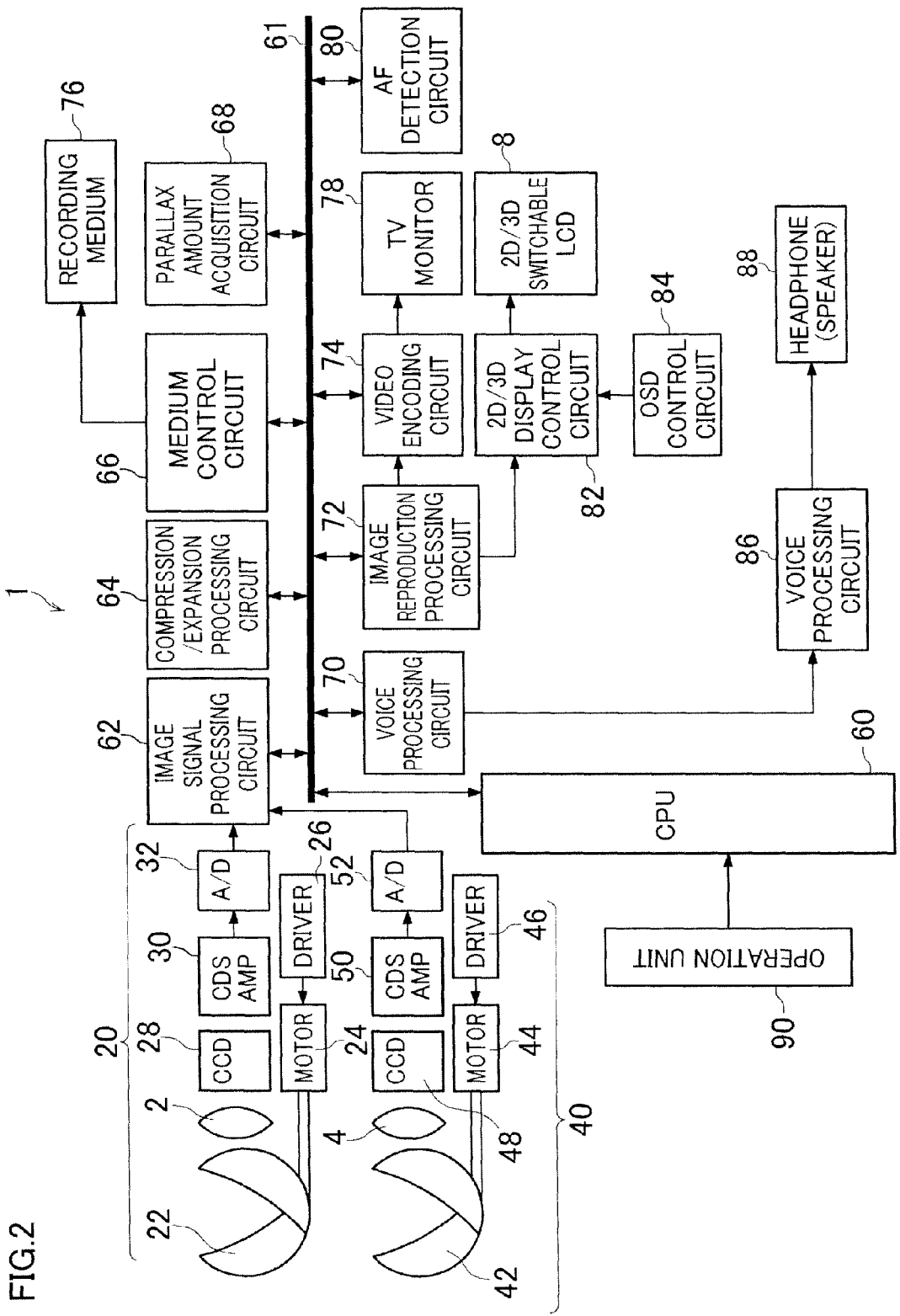
FIG. 2 is a block diagram illustrating an electrical configuration of the digital stereoscopic camera of the embodiment.

FIG. 2 is a block diagram illustrating an electrical configuration of a digital stereoscopic camera 1.

The first imaging unit 20 includes the first lens 2, a first lens barrier 22, a first motor 24, a first motor driver 26, a first CCD 28, a first analog signal processing device (CDS/AMP, Correlated double sampling amplifiers) 30, and a first A/D (analog-to-digital) converter 32.

The second imaging unit 40 includes the second lens 4, a second lens barrier 42, a second motor 44, a second motor driver 46, a second CCD 48, a second analog signal processing device (CDS/AMP) 50, and a second A/D converter 52.

The first lens 2 is illustrated in a simplified form in FIG. 2, but in fact, is configured to include a zoom lens, a focus lens, and an aperture. Both the first lens 2 and the first lens barrier 22 are driven by the first motor 24. The first motor 24 is connected to the first motor driver 26. The first motor driver 26 is connected to a CPU (Central Processing Unit) 60 which controls the entire operation of the digital stereoscopic camera 1. The CPU 60 controls the first motor driver 26 to drive the first lens barrier 22 and the first lens 2.

The first lens 2 focuses an object image on a light receiving surface of the first CCD 28. The first CCD 28 converts the object image to an electrical signal (image signal) by photoelectric conversion. The image signal is sent from the first CCD 28 to a first analog signal processing device 30. The first analog signal processing device 30 performs correlated double sampling (CDS) process and amplification (AMP) process on the inputted image signal, and outputs the processed image signal.

Here, the correlated double sampling is a process of calculating the difference between a level of a field through component and a level of a pixel signal component included in an output signal corresponding to each pixel of the first CCD 28 (or the second CCD 48) so as to reduce noise (particularly thermal noise) and the like included in the output signal of the imaging element.

The image signal which is amplified after correlated double sampling process in the first analog signal processing device 30 is inputted to a first A/D converter 32. Then, the image signal is converted from analog data to digital data in first A/D converter 32. Then, the digital data is outputted as image data for a right eye (right eye-image data) to a later described image signal processing circuit 62 through an image input controller (not illustrated).

Likewise, the second imaging unit 40 operates in the same manner as the above described first imaging unit 20. An image signal of an object image imaged by the second CCD 48 through the second lens 4 is subjected correlated double sampling and amplification in the second analog signal processing device (CDS/AMP) 50. Then, the object image is inputted to the second A/D converter 52, from which the digital data is outputted as image data for a left eye (left eye-image data) to the image signal processing circuit 62 through an image input controller (not illustrated).

The image signal processing circuit 62 is connected to the CPU 60 through a data bus 61. The CPU 60 is connected through the data bus 61 to the image signal processing circuit 62, a compression/expansion processing circuit 64, a medium control circuit 66, a parallax amount acquisition circuit 68, a voice processing circuit 70, an image reproduction processing circuit 72, a video encoding circuit 74, an AF (automatic focus) detection circuit 80.

The CPU 60 controls the image input controller to store image data in a memory (not illustrated). The image signal processing circuit 62 performs various image processes on the inputted image data such as gradation conversion, color conversion, hyper-tone processing, hyper-sharpness processing.

The CPU 60 controls the compression/expansion processing circuit 64 to compress the image data stored in the memory according to a compression format such as a JPEG (Joint Photographic Experts Group) format. The CPU 60 controls the medium control circuit 66 to record the compressed image data in a recording medium 76 such as a memory card. When image recorded in the recording medium 76 is to be reproduced, the CPU 60 controls the medium control circuit 66 to read the image data from the recording medium 76 and further controls the compression/expansion processing circuit 64 to expand the compressed image data.

The CPU 60 controls the image reproduction processing circuit 72 and the 2D/3D display control circuit 82 to display the image data on the LCD panel 8. Note that the LCD panel 8 is a 2D/3D switchable LCD and supports displaying a stereo image.

When a 3D image is displayed on the LCD panel 8 from an image for a right eye (right eye-image) and an image for a left eye (left eye-image) which are imaged by the first imaging unit 20 and the second imaging unit 40 respectively, the parallax amount acquisition circuit 68 acquires a parallax at each position in the right eye-image and the left eye-image.

The image data subjected to the prescribed signal processing in the image signal processing circuit 62 is outputted to the video encoding circuit 74 for display. The video encoding circuit 74 is connected to a TV (television) monitor 78. When the TV monitor 78 is used as an electronic viewfinder at the shooting mode, the image data is displayed as a live view image (through image) on the TV monitor 78 through the video encoding circuit 74. When the TV monitor 78 allows digital signals to be inputted, the video encoding circuit 74 is not required, but the image reproduction processing circuit 72 should output a digital signal in a format conforming to the input specifications of the TV monitor 78.

When the shutter button 6 is half-pressed in a shooting standby state, the AF detection circuit 80 calculates a parameter (physical amount) required for AF control based on the inputted image signal in response to an instruction from the CPU 60.

The AF detection circuit 80 calculates a focus evaluation value representing sharpness of the image from the inputted image signal. The CPU 60 detects a position in which the focus evaluation value calculated by the AF detection circuit 80 becomes a local maximum and moves the focus lens to the position. More specifically, the CPU 60 moves the focus lens at a predetermined step from close range to infinity, acquires a focus evaluation value at each position, and sets the position in which the obtained focus evaluation value is a local maximum, as the focusing position. Then, the CPU 60 moves the focus lens group to the position. The AF detection is not particularly limited to the above method, but for example, here, the AF control (so-called contrast AF) is performed based on the contrast of an image obtained from an imaging element (CCD).

The image signal processing circuit 62 converts the YC signal of right eye image data which is shot and inputted by the first CCD 28 through the first lens 2 and left eye image data which is shot and inputted by the second CCD 48 through the second lens 4, to a video signal for right eye and a video signal for left eye in a predetermined format (e.g., a color composite video signal in an NTSC (National Television System Committee) format). Then, the image signal processing circuit 62 combines the video signal for right eye and the video signal for left eye to generate stereo image data for stereoscopic display. The image data for display is displayed on the LCD panel (2D/3D switchable LCD) 8 through the image reproduction processing circuit 72 and the 2D/3D display control circuit 82.

The CPU 60 is connected to the voice processing circuit 70. The voice processing circuit 70 is connected to a voice reproduction circuit 86. Further, the voice reproduction circuit 86 is connected to a voice output device 88 (a headphone or a speaker). When the moving image mode is selected at the shooting mode, the CPU 60 controls the voice processing circuit 70 to store voice data acquired from a microphone (not illustrated) together with the image data in the recording medium 76. When voice data recorded in the recording medium 76 is to be reproduced, the CPU 60 controls the voice reproduction circuit 86 to output voice from the voice output device 88. Moreover, for example, the CPU 60 controls the voice reproduction circuit 86 to output a shutter sound at shooting from the voice output device 88.

The digital stereoscopic camera 1 of the present embodiment includes an OSD (on-screen display) control circuit 84. Based on an instruction from the CPU 60, the OSD control circuit 84 generates an icon (OSD information) such as a character and a figure displaying the state of the camera and other information such as the set mode, and displays the icon together with the image (superimposed on the image) on the LCD panel 8 through the 2D/3D display control circuit 82. The presently disclosed subject matter relates to a control of the display of the OSD information. Note that the detail thereof will be described later.

The CPU 60 is connected to an operation unit 90. The operation unit 90 includes various input instruction devices such as a shooting mode selector switch, a power switch, a shutter button, a moving image selecting button, a zoom button, and a menu button.

Hereinafter, the OSD control as an operation of the present embodiment will be described.

First, a first example is provided for the purpose of improving visibility of 3D image display at operation of the shutter button 6 when a 3D image is imaged.

When the shutter button 6 is operated, the OSD normally displays "AF target mark", "Shutter speed", "f-number", "Flashlight icon", and the like. However, the OSD information superimposed on a 3D image may interfere with stereoscopic viewing. In light of this, the present embodiment is configured to control the OSD display so as to erase all or part of the OSD information when the shutter button 6 is operated.

Figure 3:
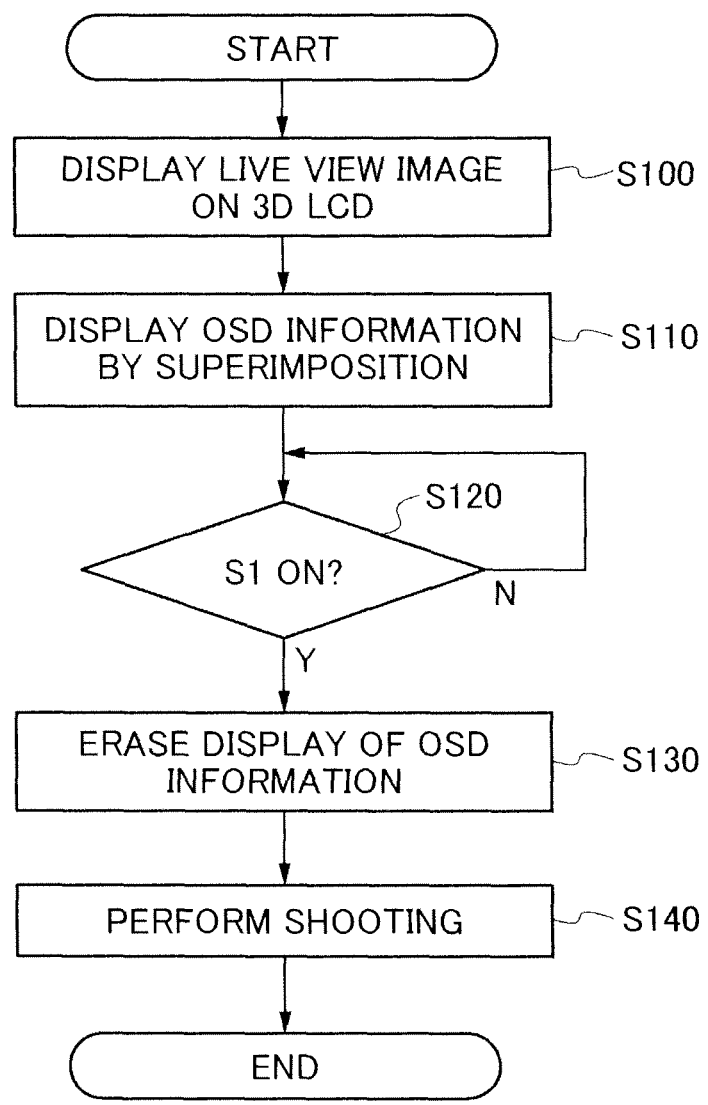
FIG. 3 is a flowchart illustrating the first example of an OSD control.

FIG. 3 illustrates a flowchart of a first example of the OSD control.

First, in step S100 of FIG. 3, when the digital stereoscopic camera 1 is turned on to enter the 3D image shooting mode, a through image of the 3D image is displayed on the LCD panel 8 corresponding to the 3D image display.

Figure 4:
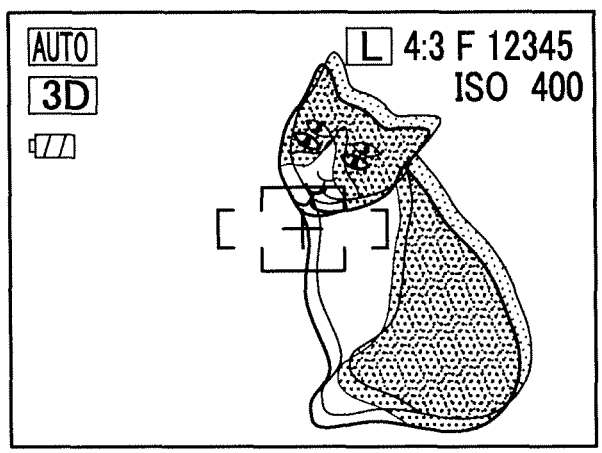
FIG. 4 is an explanatory drawing illustrating an example of a display device (LCD panel) displaying OSD information superimposed on a display image.

Then, in step S110, the CPU 60 controls the OSD control circuit 84 to display OSD information on the LCD panel 8 by superimposing the OSD information on an object image displayed as a 3D image, as illustrated in FIG. 4.

Then, in step S120, the CPU 60 determines whether the shutter button 6 is operated. If the shutter button 6 is half-pressed (S1 ON), the CPU 60 performs AF detection through the AF detection circuit 80 to set focus lock (stop moving the position of the focus lens). At this time, when the OSD information is displayed during focus lock, it is difficult to see the object image displayed as a 3D image displayed on the LCD panel 8. Therefore, in step S130, the CPU 60 controls the OSD control circuit 84 to erase the OSD information from the LCD panel 8.

In step S130, all OSD information may be erased, or only a part of the OSD information may be erased.

Figure 5A:
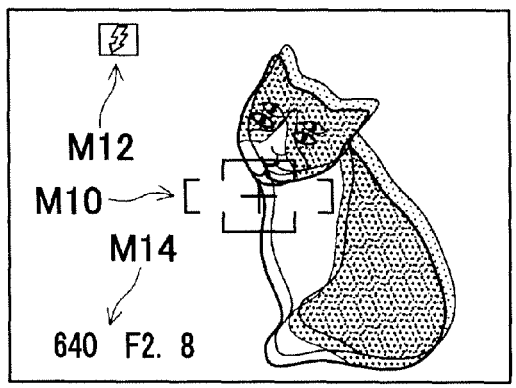
FIGS. 5A to 5D are explanatory drawings illustrating an example of a screen display of the first example of the OSD control.
Figure 5B:
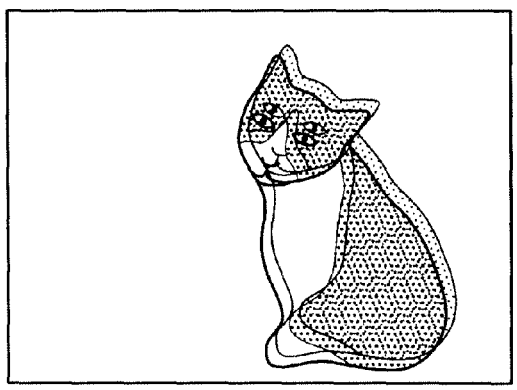
Figure 5C:
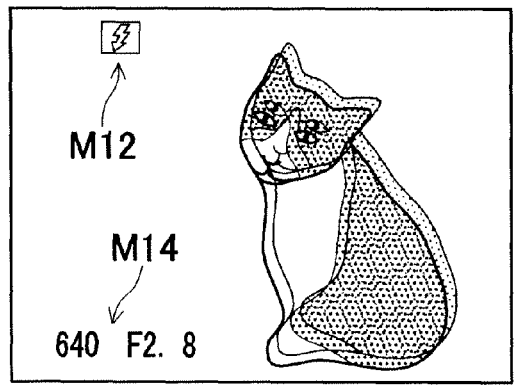
Figure 5D:
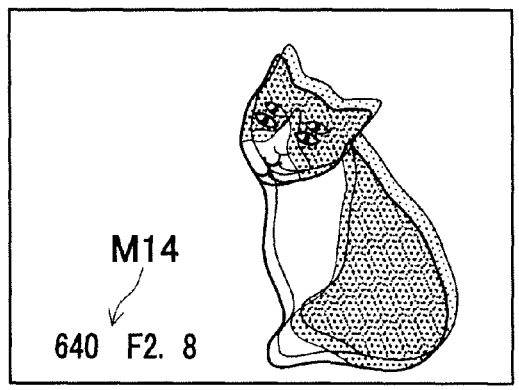

FIG. 5A illustrates an example of display of normal OSD information when the shutter button 6 is half-pressed. In this case, the OSD information includes an AF target mark M10 (icon) indicating an object to be in focus, a flash mark M12 (icon), and characters M14 indicating a shutter speed and an aperture value (f-number). As illustrated in FIG. 5A, the AF target mark M10 is displayed in the center of the screen; the flash mark M12 is displayed in an upper portion of the screen; and further the characters M14 are displayed in a lower portion of the screen. Then, the OSD information may be erased in such a manner that all OSD information (M10, M12 and M14) is erased as illustrated in FIG. 5B; only the AF target mark M10 in the center of the screen is erased as illustrated in FIG. 5C; or the AF target mark M10 in the center of the screen and the flash mark M12 in the upper portion of the screen are erased as illustrated in FIG. 5D.

Erasing all OSD information is to eliminate all display interfering with stereoscopic viewing. Erasing the AF target mark M10 in the center of the screen can improve visibility of stereoscopic viewing by erasing the mark M10 displayed in the center since a principal object is often displayed in the center. Further, visibility of stereoscopic viewing is improved by erasing a mark M12 displayed in the upper portion of the screen since a distant object is often displayed in the upper portion of the screen and is likely to be targeted for stereoscopic viewing.

Meanwhile, in step S120, if a determination is made that the shutter button 6 is not operated, the process retunes to step S120, in which a determination is made again whether the shutter button 6 is operated or not. In this manner, after the OSD information (M10, M12 or M14) is erased, the process moves to step S140, in which the shutter button 6 is fully pressed (S2 ON) to perform shooting.

Figure 6:
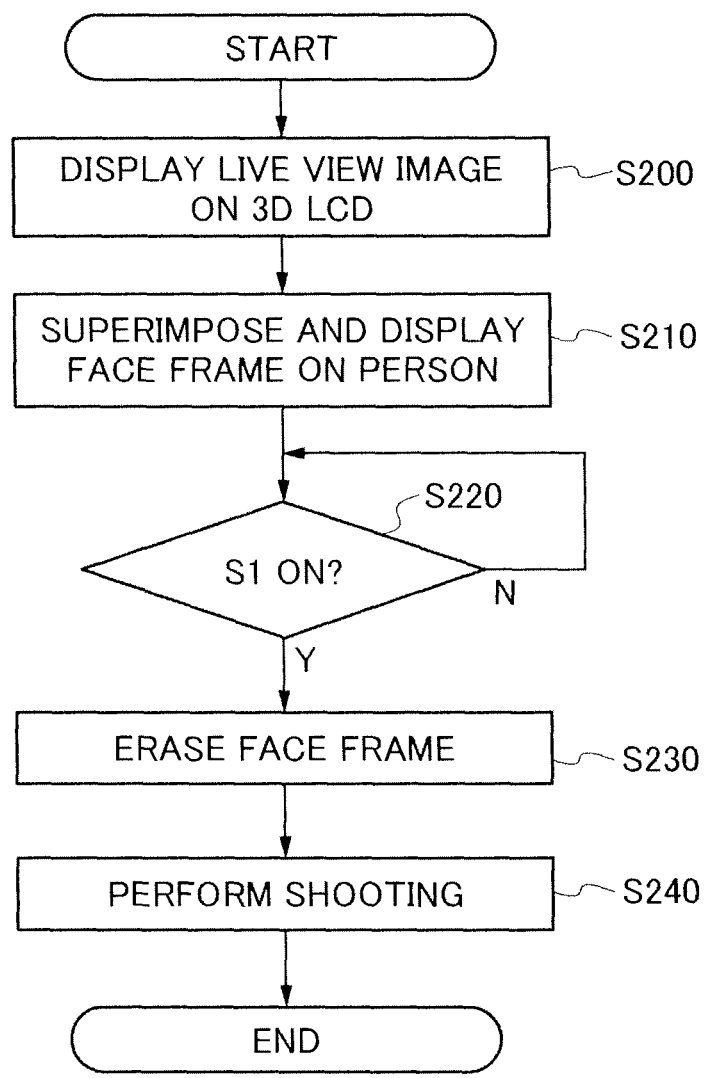
FIG. 6 is a flowchart illustrating the second example of the OSD control.

Now, a second example of the OSD control will be described. FIG. 6 illustrates a flowchart of the second example of the OSD control.

This example is provided for the purpose of improving visibility of stereoscopic display at operation of the shutter button 6 including a face frame display at face detection.

First, in step S200 of FIG. 6, when the digital stereoscopic camera 1 is turned on to enter the 3D image shooting mode, a through image of the 3D image is displayed on the LCD panel 8 corresponding to the 3D image display.

Figure 7A:
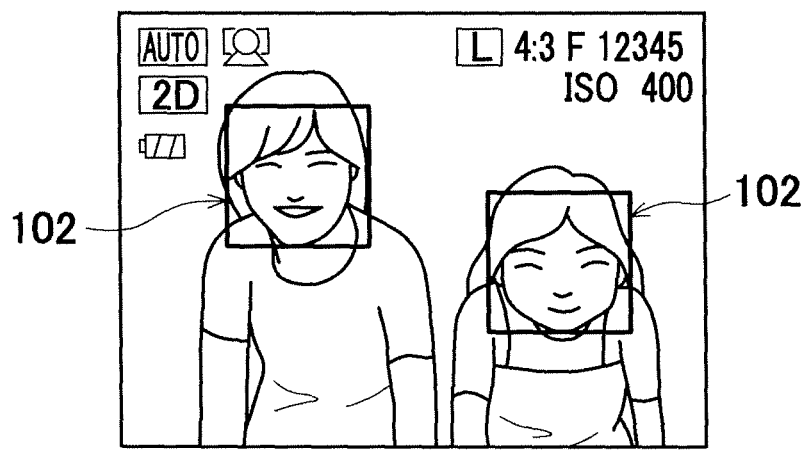
FIGS. 7A and 7B are explanatory drawings illustrating an example of a screen display of the second example of the OSD control.

Then, in the face detection mode, in step S210, as illustrated in FIG. 7A, a face frame 102 is superimposed and displayed on each detected face of the object persons.

Then, in step S220, the CPU 60 determines whether the shutter button 6 is operated. If the shutter button 6 is half-pressed (S1 ON), the CPU 60 performs AF detection through the AF detection circuit 80 to set focus lock.

Figure 7B:
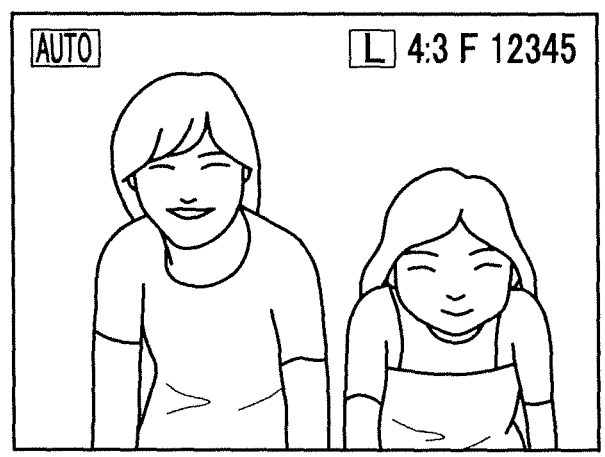

Then, if the shutter button 6 is operated and focus lock is set, in step S230, as illustrated in FIG. 7B, the face frame 102 is erased. Thereby, the face frames 102 which are superimposed and displayed on each face at face detection and interfere with stereoscopic viewing are eliminated. Therefore, visibility of stereoscopic display at operation of the shutter button 6 including a face frame display at face detection is improved.

Meanwhile, in step S220, if a determination is made that the shutter button 6 is not operated, the process returns to step S220, in which a determination is made again whether the shutter button 6 is operated or not. In this manner, after the OSD information is erased, the process moves to step S240, in which the shutter button 6 is fully pressed (S2 ON) to perform shooting.

This example can improve visibility of stereoscopic viewing at face detection.

Now, a third example of the OSD control will be described. FIG. 8 illustrates a flowchart of the third example of the OSD control.

This example is also provided for the purpose of improving visibility at stereoscopic display. Unlike the above described method, OSD information interfering with stereoscopic viewing is not erased, but the OSD information is moved to an area with a small amount of parallax on the screen and is displayed in the area so as not to interfere with stereoscopic viewing as much as possible. Note that the area with a small amount of parallax on the screen nearly appears a two-dimensionally area, and thus the OSD information displayed in this area does not interfere with stereoscopic viewing very much.

First, in step S300 of FIG. 8, when the digital stereoscopic camera 1 is turned on to enter the 3D image shooting mode, a through image of the 3D image is displayed on the LCD panel 8 corresponding to the 3D image display.

Figure 9:
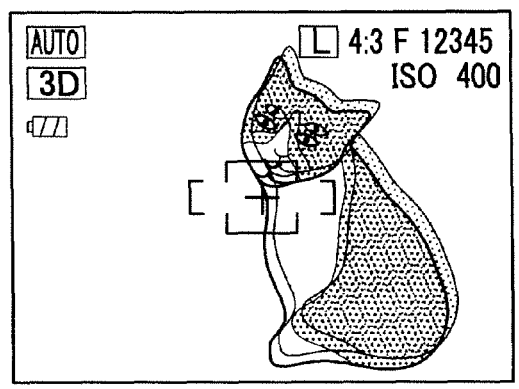
FIG. 9 is an explanatory drawing illustrating an example of an LCD panel displaying OSD information superimposed on a display image.

Then, in step S310, the CPU 60 controls the OSD control circuit 84, for example, as illustrated in FIG. 9, to display OSD information on the LCD panel 8 by superimposing the OSD information on an object image displayed as a 3D image.

Figure 10A:
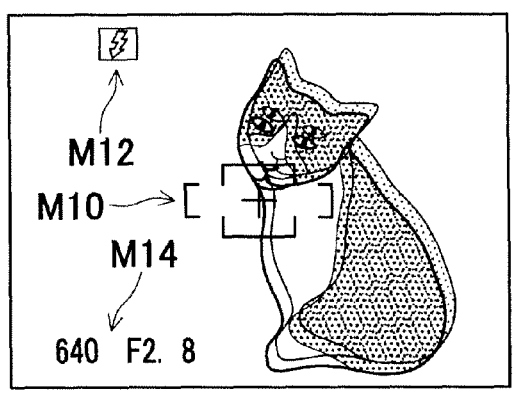
FIGS. 10A and 10B are explanatory drawings illustrating an example of a screen display of the third example of the OSD control.

Then, in step S320, the CPU 60 determines whether the shutter button 6 is operated or not. If the shutter button 6 is half-pressed (S1 ON), the CPU 60 performs AF detection through the AF detection circuit 80 to set focus lock. At this time, the LCD panel 8 displays normal OSD information superimposed and displayed on the 3D image when the shutter button 6 is half-pressed as illustrated in FIG. 10A. Specifically, as illustrated in FIG. 10A, an AF target mark M10 is displayed in the center of the screen; a flash mark M12 is displayed in an upper portion of the screen; and characters M14 indicating a shutter speed and an aperture value (f-number) are displayed in a lower portion of the screen.

Meanwhile, in step S320, if a determination is made that the shutter button 6 is not operated, the process returns to step S320, in which a determination is made again whether the shutter button 6 is operated or not.

Then, in step S330, the CPU 60 acquires a parallax amount of the entire display area through the parallax amount acquisition circuit 68. At this time, the parallax amount acquisition circuit 68 divides the entire display area into several areas and acquires a parallax amount of each area.

Figure 10B:
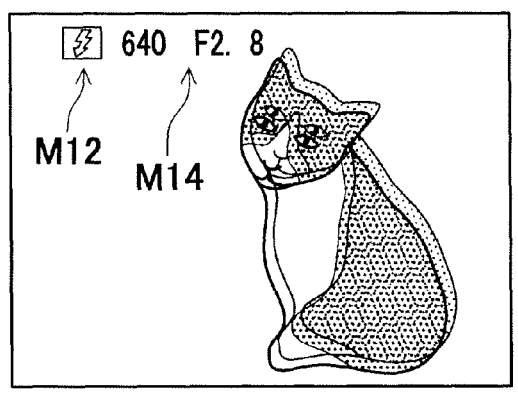

Then, in step S340, the CPU 60 controls the OSD control circuit 84 to move and display the OSD information to an area in which the above acquired parallax amount is small. For example, assuming that the upper portion of the screen has a small amount of parallax, as illustrated in FIG. 10A, the characters M14 indicating the shutter speed and the aperture value (f-number) displayed so far in the lower portion of the screen are moved and displayed on the upper portion of the screen, as illustrated in FIG. 10B. Further, at this time, the AF target mark M10 displayed in the center of the screen is erased.

Then, in step S350, the shutter button 6 is fully pressed (S2 ON) to perform shooting.

According to this example, the OSD information displayed on the screen is displayed in an area other than an area with a large parallax amount (an area in which the object image is seen stereoscopically), and thus the OSD information can be displayed without interfering with stereoscopic viewing.

Figure 11:
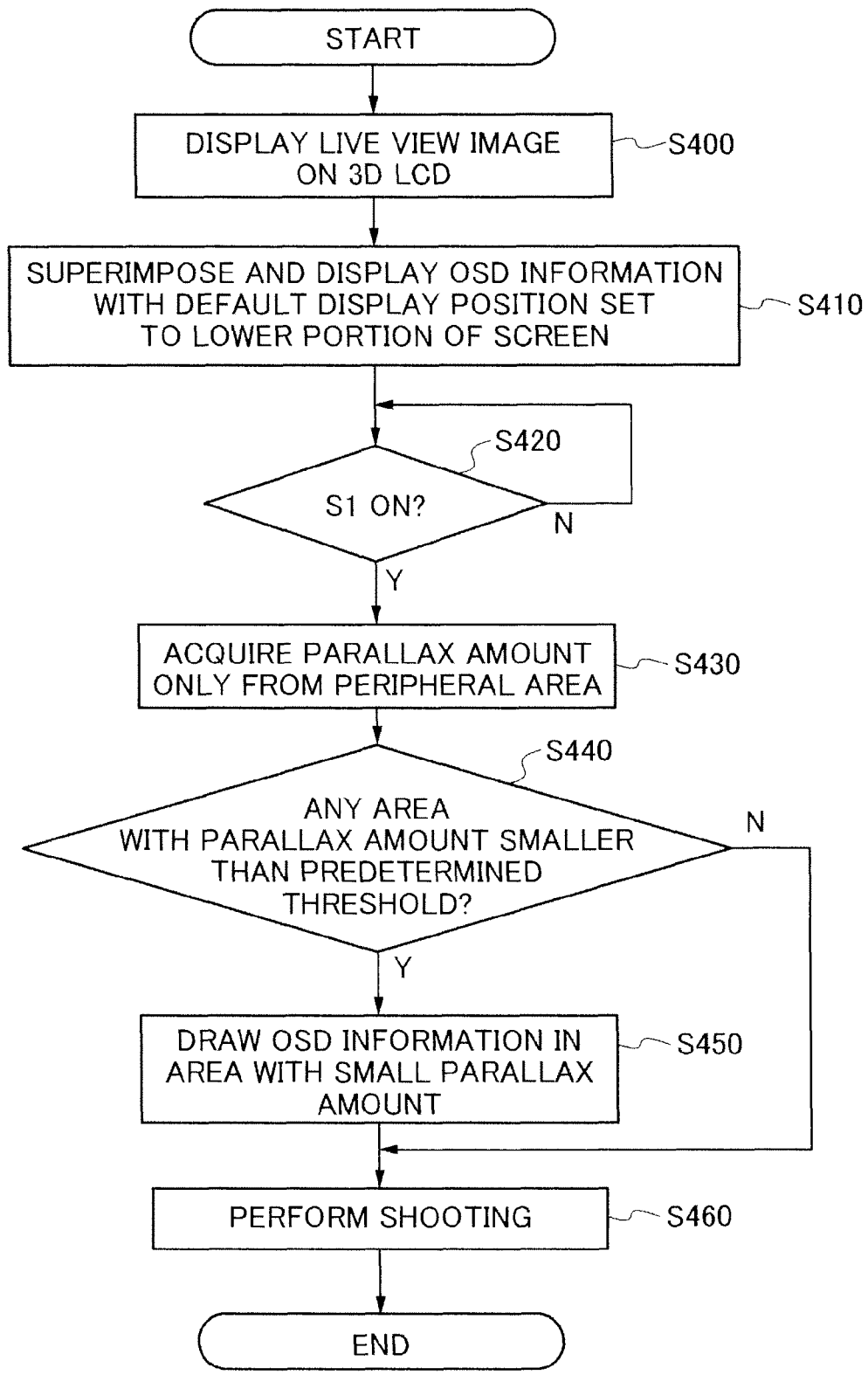
FIG. 11 is a flowchart illustrating the fourth example of the OSD control.

Now, a fourth example of the OSD control will be described. FIG. 11 illustrates a flowchart of the fourth example of the OSD control. This example is also configured to display the OSD information in an area with a small amount of parallax by calculating the amount of parallax. Unlike the above described examples, in order to efficiently doing this, this example assumes that generally principal objects are displayed in a center portion of the screen and thus the OSD information is not displayed in the center portion of the screen from the beginning. That is, this example is configured not to acquire the amount of parallax in the center portion of the screen. Hereinafter, by referring to the flowchart, the OSD control of the present example will be described.

First, in step S400 of FIG. 11, when the digital stereoscopic camera 1 is turned on to enter the 3D image shooting mode, a through image of the 3D image is displayed on the LCD panel 8 corresponding to the 3D image display.

Then, in step S410, the CPU 60 controls the OSD control circuit 84 to display OSD information on the LCD panel 8 by superimposing the OSD information on an object image displayed as a 3D image. Note that, here, the default OSD display position is set not to the center of the screen in which principal objects are displayed nor the upper portion of the screen in which the background is displayed but to the lower portion of the screen.

Then, in step S420, the CPU 60 determines whether the shutter button 6 is operated or not. If the shutter button 6 is half-pressed (S1 ON), the CPU 60 performs AF detection through the AF detection circuit 80 to set focus lock. At this time, as illustrated in FIG. 12, the LCD panel 8 superimposes and displays the OSD information on a 3D image in such a manner that the AF target mark M10 is displayed in the center of the screen; the flash mark M12 is displayed in the upper portion of the screen; and the characters M14 indicating the shutter speed and the aperture value (f-number) are displayed in the lower portion of the screen.

Figure 12:
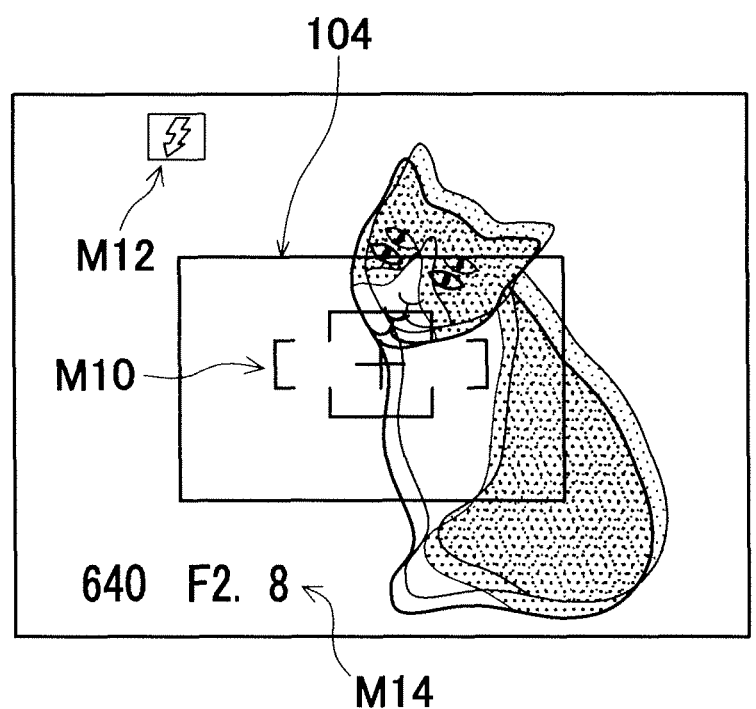
FIG. 12 is an explanatory drawing illustrating an example of a screen display of the fourth example of the OSD control.

If a determination is made that the shutter button 6 is operated, the process moves to step S430, in which the amount of parallax is not acquired from the center portion indicated by a rectangular frame 104 as illustrated in FIG. 12, but is acquired only from the peripheral area of the screen. Meanwhile, if a determination is made that the shutter button 6 is not operated, the process returns to step S420, in which a determination is made again whether the shutter button 6 is operated or not.

Then, in step S440, a determination is made whether there is an area in which the acquired parallax amount is smaller than a predetermined threshold. If a determination is made that there is an area in which the acquired parallax amount is smaller than a predetermined threshold, the process moves to step S450, in which the coordinates for displaying the OSD information are changed to the area with a small amount of parallax and moves the OSD display thereto.

Meanwhile, if a determination is made that there is no area in which the acquired parallax amount is smaller than a predetermined threshold, the OSD display position is not changed. Thus, according to the present example, first, the amount of parallax is acquired from the peripheral portion of the screen; then, if an area in which the acquired parallax amount is smaller than a predetermined threshold is found, the OSD display is moved to the area; and if an area in which the acquired parallax amount is smaller than a predetermined threshold is not found, the OSD display position is not changed and the OSD display remains in the default position. Here, the predetermined threshold depends on the pixel size of the display apparatus, and the threshold may be about 3% of the horizontal resolution of the display device. More specifically, the threshold may be equal to about 3% of the number of pixels along the horizontal direction (horizontal width (pixel)) of the display screen of the display device such as the LCD 8 and TV monitor 78. Then, the displacement (pixels) of the positions of the identical object in the right eye-image and the left eye-image is smaller than the threshold, the process moves to step S450. Otherwise, the process moves to step S460. Apparently, the threshold is not limited to this value.

Then, in step S460, the shutter button 6 is fully pressed (S2 ON) to perform shooting.

As described above, according to the present example, when the shutter button 6 is operated, the amount of parallax is acquired only from the peripheral area of the screen and unnecessary processing is avoided by not acquiring the amount of parallax from the center of the screen in which principal objects are often displayed. Thus, the OSD display control for improving visibility of stereoscopic display can be efficiently performed.

Note that the above described OSD information includes a display of the flash mark, characters indicating the shutter speed, and the aperture value (f-number), and the like, but the OSD information is not limited to these, and may include various displays or icons. For example, when the flash mode is set at shooting, depending on the user operation, the display may include characters relating to the flash such as "Auto flash", "Red-eye reduction", "Forced flash", "Flash suppression", "Slow sync", "Red-eye slow", and the like, each of which is displayed together with a predetermined character or icon, which is configured to be erased when a predetermined time has elapsed.

Hereinbefore, the 3D imaging apparatus and the 3D image display method of the presently disclosed subject matter have been described in detail. Note that the presently disclosed subject matter is not limited to the above examples or embodiments, and it will be apparent that various improvements and modifications can be made to the presently disclosed subject matter without departing from the spirit and scope of the presently disclosed subject matter.

What is claimed is:

1. A three-dimensional imaging apparatus comprising:
a plurality of shooting devices configured to shoot an object;
a shutter switch;
a display device configured to display a three-dimensional image generated by a plurality of images obtained by shooting an identical object from a plurality of view points by the plurality of shooting devices;
an OSD (on-screen display) control device configured to control display of OSD information superimposed and displayed on an image displayed on the display device; and
a calculation device configured to calculate a parallax amount of each of a plurality of areas which are obtained by dividing a peripheral area of a display screen of the display device,
wherein the OSD control device moves the display of the OSD information displayed on the display device to an area the parallax amount of which is smaller than a threshold value, when the shutter switch is operated.

2. The three-dimensional imaging apparatus according to claim 1, further comprising:
a face detection device configured to detect a face of a person in the plurality of images; and
a face frame display device configured to display a face frame on the detected face in a three-dimensional image generated by the plurality of images in which a face of a person is detected,
wherein the OSD control device erases the face frame displayed on the display device when the shutter switch is operated.

3. The three-dimensional imaging apparatus according to claim 2, further comprising a focus control device configured to control a position of the focus lens included in each of the shooting devices,
wherein the OSD control device erases the display of the OSD information on the display device when the shutter switch is operated to fix the position of the focus lens.

4. A three-dimensional image display method comprising:
displaying a three-dimensional image on a display device configured to display a three-dimensional image generated by a plurality of images obtained by shooting an identical object from a plurality of viewing points by a plurality of shooting devices;
superimposing and displaying a display of OSD (on-screen display) information on the three-dimensional image displayed on the display device; and
calculating a parallax amount of each of a plurality of areas which are obtained by dividing a peripheral area of a display screen of the display device,
wherein the display of the OSD information displayed on the display device is moved to an area the parallax amount of which is smaller than a threshold value, when the shutter switch is operated.

5. The three-dimensional image display method according to claim 4, further comprising:
detecting a face of a person in the plurality of images;
displaying a face frame on the detected face in a three-dimensional image generated by the plurality of images in which a face of a person is detected; and
erasing the face frame displayed on the display device when the shutter switch is operated.

6. A three-dimensional imaging apparatus comprising:
a plurality of shooting devices configured to shoot an object;
a shutter switch;
a display device configured to display a two-dimensional image or a three-dimensional image generated by a plurality of images obtained by shooting an identical object from a plurality of view points by the plurality of shooting devices;
a selector device configured to switch the display between the two-dimensional image and the three-dimensional image; and
an OSD (on-screen display) control device configured to control a display or a plurality of displays of OSD information in such a manner that, when the two-dimensional image is displayed, an icon which is related to focus control is superimposed and displayed as the OSD information on the two-dimensional image displayed on the display device in response to an operation of half-pressing the shutter switch, and in such a manner that, when the three-dimensional image is displayed, all or a part of the displays of the OSD information including the icon which is superimposed and displayed on the three-dimensional image is erased in response to an operation of half-pressing the shutter switch.

7. The three-dimensional imaging apparatus according to claim 6, further comprising an automatic focus function device, wherein the icon which is related to focus control comprises an auto-focus (AF) target mark.

8. The three-dimensional imaging apparatus according to claim 7, wherein the OSD control device erases the display or the plurality of displays of the OSD information which are displayed on the display device during focus lock.

9. The three-dimensional imaging apparatus according to claim 8, further comprising:
   a face detection device configured to detect a face of a person on the display device; and
   a face frame display device configured to display a face frame on the detected face,
   wherein the OSD information includes the face frame, and the OSD control device erases a display of the face frame on the display device during focus lock.

10. The three-dimensional imaging apparatus according to claim 6, wherein the OSD control device erases the OSD information displayed in an area in which a principal object is displayed on the display device.

11. A three-dimensional imaging apparatus comprising:
   a plurality of shooting devices configured to shoot an object;
   a shutter switch;
   a display device configured to display a two-dimensional image or a three-dimensional image generated by a plurality of images obtained by shooting an identical object from a plurality of view points by the plurality of shooting devices;
   a selector device configured to switch the display between the two-dimensional image and the three-dimensional image;
   a calculation device configured to calculate a parallax amount of each of a plurality of areas which are obtained by dividing a display screen of the display device; and
   an OSD (on-screen display) control device configured to control a display or a plurality of displays of OSD information in such a manner that, when the two-dimensional image is displayed, an icon which is related to focus control is superimposed and displayed as the OSD information on the two-dimensional image displayed on the display device in response to an operation of half-pressing the shutter switch, and in such a manner that, when the three-dimensional image is displayed, in response to an operation of half-pressing the shutter switch, the OSD information including the icon which is superimposed and displayed on the three-dimensional image is displayed on an area, the parallax amount of which is smallest of the parallax amounts of the plurality of areas.

12. A three-dimensional image display method comprising:
   displaying a two-dimensional image or a three-dimensional image generated by a plurality of images obtained by shooting an identical object from a plurality of view points by a plurality of shooting devices, on a display device which switches a display between the two-dimensional image and the three-dimensional image; and
   controlling a display in such a manner that, when the two-dimensional image is displayed, an icon which is related to focus control is superimposed and displayed as OSD (on-screen display) information on the two-dimensional image displayed on the display device in response to an operation of half-pressing a shutter switch, and in such a manner that, when the three-dimensional image is displayed all or a part of the displays of the OSD information including the icon which is superimposed and displayed on the three-dimensional image is erased in response to an operation of half-pressing the shutter switch.

13. The three-dimensional imaging display method according, to claim 12, wherein the icon which is related to focus control comprises an auto-focus (AF) target mark.

14. The three-dimensional imaging display method according to claim 12, further comprising:
   detecting a face of a person on the display device;
   displaying a face frame on the detected face, the face frame being included in the OSD information; and
   erasing a display of the face frame on the display device during focus lock.

* * * * *